(12) United States Patent
Kress

(10) Patent No.: US 7,207,754 B2
(45) Date of Patent: Apr. 24, 2007

(54) TOOL FOR MACHINING WORKPIECES

(75) Inventor: Dieter Kress, Aalen (DE)

(73) Assignee: MAPAL Fabrik für Präzisionswerkzeuge Dr. Kress KG (DE)

( * ) Notice: Subject to any disclaimer, the term of this patent is extended or adjusted under 35 U.S.C. 154(b) by 11 days.

(21) Appl. No.: 11/062,947

(22) Filed: Feb. 22, 2005

(65) Prior Publication Data

US 2005/0226693 A1    Oct. 13, 2005

(30) Foreign Application Priority Data

Feb. 23, 2004    (DE)    ................. 10 2004 008 725

(51) Int. Cl.
  *B23Q 11/10*    (2006.01)
  *B23B 51/06*    (2006.01)

(52) U.S. Cl. ................. 409/136; 409/232; 408/57; 408/147

(58) Field of Classification Search ............ 408/56, 408/57, 147, 153, 158, 156; 82/1.2, 1.4; 409/136, 135, 137, 232, 234, 204, 206
  See application file for complete search history.

(56) References Cited

U.S. PATENT DOCUMENTS

| | | | | |
|---|---|---|---|---|
| 3,740,161 A * | 6/1973 | Milewski | ................. | 408/158 |
| 4,224,846 A * | 9/1980 | Eysel et al. | ................. | 82/158 |
| 4,432,259 A * | 2/1984 | Werth, Jr. | ................. | 82/131 |
| 4,941,782 A * | 7/1990 | Cook | ................. | 408/147 |
| 5,304,019 A * | 4/1994 | Klee et al. | ................. | 408/156 |
| 5,927,910 A * | 7/1999 | Fix, Jr. | ................. | 408/17 |
| 6,676,340 B2 | 1/2004 | Kress et al. | ................. | 408/24 |
| 6,760,961 B2 * | 7/2004 | Upadhya | ................. | 29/27 C |
| 6,779,953 B2 * | 8/2004 | Suzuki et al. | ................. | 408/147 |

FOREIGN PATENT DOCUMENTS

DE    100 44 972 A1    4/2002

* cited by examiner

*Primary Examiner*—Erica Cadugan
(74) *Attorney, Agent, or Firm*—Harness, Dickey & Pierce, P.L.C.

(57) ABSTRACT

A tool for the machining of workpieces is provided with a coolant/lubricant supply and an actuation unit for the activation of supplementary functions of the tool, with an actuation element and an actuation medium circuit. The actuation unit is separated from the coolant/lubricant supply by a separation element. The separation element can be exposed on one side to the coolant/lubricant and on the other to the actuation medium.

20 Claims, 1 Drawing Sheet

TOOL FOR MACHINING WORKPIECES

CROSS-REFERENCE TO RELATED APPLICATIONS

This application claims the benefit of German Patent Application No. 10 2004 008 725.3, filed Feb. 23, 2004. The disclosure of the above application is incorporated herein by reference.

FIELD OF THE INVENTION

The present invention relates to a tool for machining workpieces.

BACKGROUND OF THE INVENTION

Tools of the kind discussed herein relate, in particular, to tools equipped with a coolant/lubricant supply system intended for on one hand, cooling/lubricating the workpiece surface being worked on and, on the other hand, for activating an actuation unit of the tool that is provided with an actuation element and an actuation medium. Actuation units of the kind referred to here serve to activate the supplementary functions of the tool, for example the insertion and removal of supplementary elements that serve as a partial tool and are capable of performing special machining operations. Tools with such actuation units can be used, for example, to produce a recess in the wall of a borehole or to work on a valve seat in the engine block of an internal combustion engine and in direct relation therewith to work a valve stem guide. It has been found that a recirculating coolant/lubricant contains contaminants, for example silicon particles, formed during the machining of workpieces and that are deleterious to the actuation unit because they cause considerable wear and the freezing of movable parts of such a unit. For this reason, expensive filtration measures are needed to limit this drawback. Without a major expense, however, wear manifestations cannot be entirely prevented.

Also known is a tool for the machining of workpieces (DE 100 44 972 A1) that is provided with a coolant/lubricant supply system and has an actuation unit with an actuation element and an actuation medium circuit. The actuation unit is separated from the coolant/lubricant supply. The separation is brought about by the fact that the coolant/lubricant supply is associated with the cutters of the tool and serves to provide the cutters used for the machining of the workpiece with coolant/lubricant. The actuation device has its own supply of medium, separated from the coolant/lubricant supply, and is supplied with compressed air or hydraulic liquid. The tool thus distinguishes itself, on the one hand, by a coolant/lubricant supply and, on the other, by a separate supply of compressed air or hydraulic liquid, which makes the tool assembly expensive.

Hence, the object of the invention is to provide a tool of the afore-mentioned kind that avoids these drawbacks.

SUMMARY OF THE INVENTION

To reach this objective, a tool is provided and includes an actuation unit that is completely separated from the coolant/lubricant supply so that contaminants present in the coolant/lubricant cannot possibly exert a deleterious effect on the actuation unit. The tool distinguishes itself in that it is provided with a separation element which on one side can be exposed to a coolant/lubricant and on the other to an actuation medium intended to activate the actuation unit. The separation element provides the actuation element and the actuation medium thereof with reliable protection from contaminants.

Particularly preferred is an exemplary embodiment of the tool in which the separation element is in the form of a membrane. On one side said membrane is in contact with the coolant/lubricant and, on the other with the actuation medium. It is also possible to provide a mechanical separation of the two media and to adapt the membrane to the chemical properties of the substances and to the temperatures prevailing during the operation of the tool, thus ensuring a long service life.

Further areas of applicability of the present invention will become apparent from the detailed description provided hereinafter. It should be understood that the detailed description and specific examples, while indicating the preferred embodiment of the invention, are intended for purposes of illustration only and are not intended to limit the scope of the invention.

BRIEF DESCRIPTION OF THE DRAWINGS

The present invention will become more fully understood from the detailed description and the accompanying drawings, wherein.

DETAILED DESCRIPTION OF THE PREFERRED EMBODIMENTS

Figure 1:
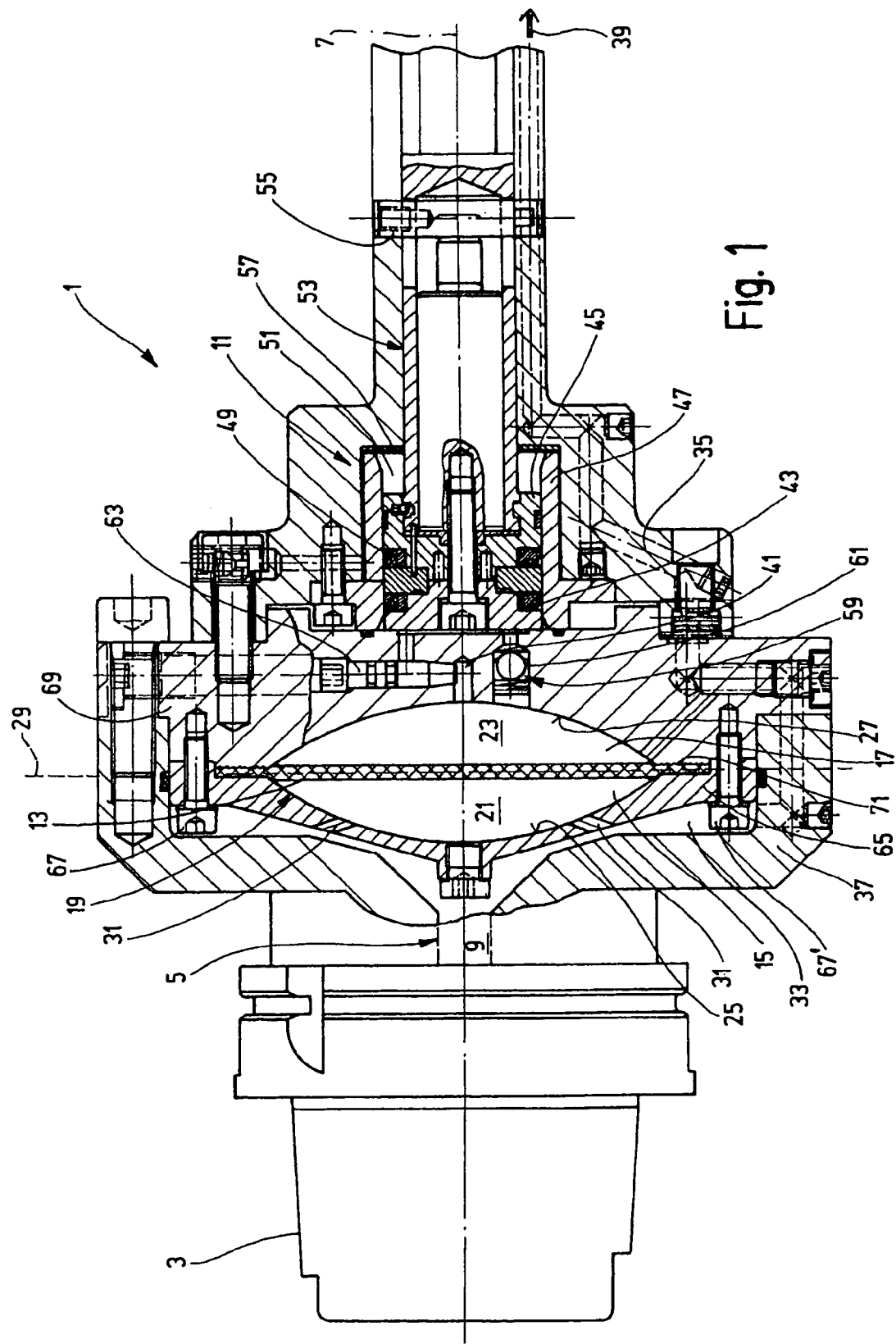
FIG. 1 shows a schematic representation of a tool in partial longitudinal section.

The following description of the preferred embodiment is merely exemplary in nature and is in no way intended to limit the invention, its application, or uses.

Tool 1 has a shaft 3 with which, via an adapter or the like, it can be connected to a machine tool that, as a rule, makes tool 1 rotate. The partial longitudinal cross-section shows a coolant/lubricant supply 5 which here has a supply channel that is concentric with the central axis 7.

Tool 1 comprises an actuation unit 11 which in principle is known and serves to implement supplementary functions of tool 1. For example, said tool can be used for the machining of a borehole surface and comprise a reamer. By means of actuation unit 11, it is possible to activate a cutting device movable in radial direction relative to central axis 7 and thus make a groove in the borehole surface prepared or machined by the tool. Actuation units 11 of the kind considered here can also be used for many other purposes.

To implement supplementary functions, it is critical that it be possible to activate said units independently of another method of tool operation.

In tool 1 represented here, actuation unit 11 is controlled via coolant/lubricant supply 5. In other words, supplementary activation devices that would render the assembly of tool 1 expensive and complicated can be omitted. For example, at a given coolant/lubricant pressure p1, it is possible to carry out a first machining step with tool 1 and, to activate actuation unit 11, to increase this pressure to a higher value of p2. Actuation unit 11 is designed so that it responds by activating a supplementary function only above a certain limiting value of the coolant/lubricant pressure.

In conventional machine tools, the coolant/lubricant is recycled and chips formed during the use of tool 1 are removed. In spite of expensive filtration systems, it is not entirely possible to prevent residues to remain in the coolant/lubricant and to cause damage to the actuation unit 11 on a continuing basis. Silicon particles, in particular, are damaging, because they are very abrasive. The exemplary embodiment of the tool shown in the figure distinguishes itself in that actuation unit 11 is completely separated from the coolant/lubricant circuit, in other words it never comes in contact with the coolant/lubricant. To accomplish this, there is provided a separation element which on one side cooperates with a actuation medium 17 assigned to actuation unit 11 and on the other with the coolant/lubricant. It is designed so that the two media do not come in contact with each other.

For example, the separation element can be in the form of a plunger which in a borehole can be displaced in the direction of the center axis of said borehole. The borehole preferably has a cylindrical shape, and the separation element is a cylindrical plunger. Appropriate sealing agents can be disposed in the region of contact between the outside of the plunger and the inside of the cylindrical bore. It is critical that the separation element and the optionally present sealing agent consist of a material that is not attacked by the coolant/lubricant on one side and by the actuation medium on the other, to ensure complete separation of actuation unit 11 and the associated actuation medium 17 from the coolant/lubricant circuit and thus from the coolant/lubricant medium.

In place of a movable separation element in the form of a plunger, it is also possible to provide a resilient plate that is firmly fastened at its edges and separates actuation medium 17 from the coolant/lubricant circuit and that, for example, by undergoing a deformation transmits to actuation medium 17 a change in pressure taking place in the circuit.

In the exemplary embodiment shown here, the separation element is in the form of a membrane 13 which on one side is exposed to the coolant/lubricant 15 supplied through feed channel 9. On the other side, said membrane is exposed to actuation medium 17 of actuation unit 11, the coolant/lubricant 15 and the actuation medium 17 being kept completely separated from each other by membrane 13.

The figure shows clearly that membrane 13 divides a space 19 into two regions, of which the first partial space 21 is in fluid connection with feed channel 9 and the second partial space 23 contains the actuation medium.

The cross-section of space 19 seen in the figure in the direction vertical to the central axis shows said space to be essentially round. As indicated by the sectional representation according to the figure, said space has two arched limiting walls 25 and 27 that are essentially symmetrical or constitute mirror images with respect to an imagined central plane 29 and are arched outward in opposite direction. When pressure is exerted on one side of the membrane, the membrane can be deflected out on the other side. Preferably, limiting walls 25 and 27 are designed so that they correspond to the contour of the maximally deflected membrane 13. In this manner, the risk of damaging membrane 13 is reduced to a minimum, because, if necessary, membrane 13 can come in contact with, and thus be supported by, limiting walls 25, 27.

In tool 1 shown here, partial space 21 is connected through at least one connecting channel 31, 31' with feed channel 9 and thus with coolant/lubricant supply 5. In other words, a coolant/lubricant supplied via feed channel 9 can reach partial space 21 via connecting channels 31, 31'.

Feed channel 9 ends in a distribution space 33 from which start out connecting channels 31, 31' and a channel 35 in main body 37 of tool 1, which channel here consists of several boreholes. As indicated by the double arrow, said channel guides the coolant/lubricant to the region in which the machining of a workpiece is taking place.

Through channel 41 consisting of at least one borehole in main body 37, partial space 23 filled with actuation medium 17 is connected with a pressure space 43 in which is movably disposed an actuation plunger 45. Opposite walls 47 of pressure space 43, actuation plunger 45 is sealed by appropriate sealing devices 49.

On the side of actuation plunger 45 facing away from pressure space 43, there is provided a compensation space 51 wherein the pressure is lower than in pressure space 43 so that when the pressure builds up in pressure space 43, actuation plunger 45 is moved in the direction of compensation space 51.

In tool 1 shown here, actuation plunger 45 is preferably disposed concentrically with central axis 7. Said plunger cooperates with a resetting device 53 which, for example, is in the form of a gas-compression spring and ensures that at a first pressure p1 in partial space 23 and thus in pressure space 43 actuation plunger 45 is forced into its starting position, shown in the figure, in which actuation unit 11 is deactivated.

In tool 1 according to FIG. 1, the gas compression spring supports resetting device 53 on an abutment 55 which here is in the form of a stop pin extending transverse to central axis 7.

In the representation according to FIG. 1, the same pressure, for example p1, prevails in partial spaces 21 and 23, so that membrane 13 is not deflected out but rests in central plane 29. Membrane 13 is also in this position when tool 1 is pressure-free in the region of feed channel 9 as well as in that of pressure space 43.

When the pressure in coolant/lubricant supply 5 rises, the coolant/lubricant at a pressure of >p1 passes through feed channel 9, distributor space 33 and via connecting channels 31, 31' into the first partial space 21. This increased pressure can be transmitted to partial space 23 with the aid of flexible membrane 13 which is deflected in the direction of limiting wall 27. As a result, actuation medium 17 is conveyed from partial space 23 through first channel 41 into pressure space 43. This occurs at least when pressure p2 overrides the counter-pressure of resetting device 53. In this case, actuation plunger moves to the right in the direction of compensation space 51. The length of compensation space 51 measured in the direction of central axis 7 is such that limiting wall 57 disposed opposite pressure space 43 serves as a stop for actuation plunger 45. Said plunger can thus be moved from the position shown in the figure along central axis 7 up to limiting wall 57. This axial displacement of actuation plunger 53 is utilized in an appropriate manner to perform a supplementary function of tool 1.

To deactivate the supplementary function, for example after making a groove in the borehole wall or after creating a bevel, actuation unit 11 is deactivated by a pressure drop in coolant/lubricant supply 5 from the increased value p2 to a reduced value p1.

When the pressure in pressure space 43 decreases, resetting device 53 of actuation plunger 45 can again be displaced into its starting position shown in the figure. Actuation medium 17 is thus forced from pressure space 43 via first channel 41 back into partial space 23. As a result, membrane 13 returns to its starting position shown in the figure.

Actuation unit 11 is provided with a valve device 59 which on one side is in fluid connection with pressure space 43 and, on the other, with partial space 23. In other words, said device is located in the control path or entry to actuation unit 11. Preferably, the valve device is in the form of a check valve and is disposed in a second channel 61 between partial space 23 and pressure space 43 so that the second channel 61 is closed when the pressure in partial space 23 is greater than in pressure space 43. When the pressure situation is reversed, actuation medium 17 can pass undisturbed from pressure space 43 via second channel 61 into second partial space 23. In other words, in this case an additional connection is created between pressure space 43 and second partial space 23: actuation medium 17 flowing back from pressure space 43 can flow either through first channel 41 or through second channel 61.

As a result of the configuration of valve device 59 described here, a first movement of actuation plunger 45 from the position shown in the figure to a second position in which actuation plunger is in contact with limiting wall 57 is defined by the flow velocity of actuation medium 17 in the first channel 41. To influence the flow velocity, a preferably adjustable choke 63 can be provided in first channel 41. The purpose of said choke is to limit the velocity of actuation plunger to a certain value when actuation unit 11 becomes activated.

When actuation unit 11 is deactivated, namely when the pressure in the second partial space 23 decreases because of a pressure reduction in first partial space 21, actuation medium 17 can flow back to second partial space 23 also via a second channel 63. The movement of actuation plunger 45 upon deactivation of actuation unit 11 can thus take place much faster than during its activation.

The explanations make clear that when choke 63 and valve device 59 are properly designed, a reverse influence on the movement of actuation plunger 45 is possible. It is also possible to have said plunger extend much faster in the event of an activation than to reset it during deactivation.

FIG. 1 shows that space 19 can be opened in the region of central plane 29. Here, a cover 65 is clearly discernible, which in appropriate manner, for example with the aid of screws 67, 67', can be fastened to a base part 69. In the closed condition of cover 65 shown in the figure, membrane 13 is firmly fastened between cover 65 and base part 69 so that even under pressure partial spaces 21 and 23 are separated without leaking. To fix the position, suitable means could be provided here, for example a corrugation 71 in base part 69.

Membrane 13 used as the separation element can itself be configured so that it can resist the pressures prevailing during the operation of tool 1. For example, it can be made of an elastic material optionally provided with a reinforcement. In principle, metallic membranes—even inherently wavy ones—can be used. To ensure a greater deflection of membrane 13 during pressure changes in coolant/lubricant supply 5, however, said membrane preferably consists of a plastic material or the like and can be reinforced with appropriate fibers.

Particularly advantageous is a membrane 13 made of a composite material, consisting of several layers and on one side provided with a material that is particularly resistant to coolant 15 and on the other side with a material that is particularly adapted to actuation medium 17. These materials must also be adapted to the temperature conditions under which tool 1 is used.

Overall, it can be seen that actuation unit 11 is completely separated from coolant/lubricant supply 5 of tool 1. This is true not only for the part that is activated and deactivated by actuation unit 11, namely for parts of the tool that are coupled with actuation plunger 5, but also for the control side of actuation plunger 45. Said plunger comes in contact exclusively with actuation medium 17, for example an oil, which under no conditions can be contaminated by any impurities present in coolant/lubricant 15.

This results in very high operating reliability of actuation unit 11 and compared to the normally used purification of the coolant/lubricant reduces the expenses incurred.

The description of the invention is merely exemplary in nature and, thus, variations that do not depart from the gist of the invention are intended to be within the scope of the invention. Such variations are not to be regarded as a departure from the spirit and scope of the invention.

What is claimed is:

1. A tool for machining workpieces, comprising:
   a control fluid supply;
   an actuation unit having an actuation element and an actuation medium for activation of supplementary functions of the tool, and
   a separation element in the form of a membrane that separates the actuation unit from the control fluid supply, wherein a first side of the separation element is exposed to the control fluid supply and second side of the separation element is exposed to the actuation medium.

2. The tool according to claim 1 wherein the separation element separates a space which is in fluid connection with the control fluid supply on the first side of the separation element and which is in fluid connection with the actuation medium on the second side of the separation element.

3. The tool according to claim 2 wherein the space is circular.

4. The tool according to claim 2 wherein the space includes arched limiting walls that are disposed in mirror-image fashion relative to a central plane and that arch outward in opposite directions and support the membrane.

5. The tool according to claim 1 wherein the separation element runs along a central plane when under an equilibrium condition.

6. The tool according to claim 1 wherein the separation element comprises metal.

7. The tool according to claim 1 wherein the separation element comprises a plastic material.

8. The tool according to claim 1 wherein the separation element comprises a plurality of layers and includes a surface that is fluid-resistant and actuation medium-resistant.

9. The tool according to claim 1 wherein the separation element comprises a composite material.

10. The tool according to claim 1 further comprising a resetting device that cooperates with the actuation element.

11. The tool according to claim 1 further comprising a valve device that is disposed in an actuation medium circuit having the actuation medium flowing therethrough.

12. The tool according to claim 1 wherein the valve device includes a check valve that enables different motion velocities of the actuation element based on a direction of movement.

13. A tool for machining workpieces, comprising:
    a control fluid supply;
    a separation element including a flexible membrane;
    an actuation medium that is separated from the control fluid supply by the separation element, wherein the control fluid supply selectively imparts force on the separation element to impart force on the actuation medium; and
    an actuation element that is selectively actuated by the actuation medium from a neutral position to enable supplementary functions of the tool.

14. The tool according to claim 13 further comprising a cavity that is bisected by the separation element to define a first cavity portion that is in fluid communication with the control fluid supply and a second cavity portion that is in fluid communication with the actuation element.

15. The tool according to claim 14 wherein the cavity includes arched limiting walls that are disposed in mirror-image fashion relative to a central plane and that arch outward in opposite directions.

16. The tool according to claim 14 wherein the separation element runs along a central plane of the cavity when under an equilibrium condition.

17. The tool according to claim 13 further comprising a resetting device that biases the actuation element to the neutral position.

18. The tool according to claim 13 further comprising a valve device that is disposed in an actuation medium circuit having the actuation medium flowing therethrough.

19. A tool for machining workpieces, comprising:
 a housing defining a space;
 a control fluid supply in communication with the space;
 an actuation unit having an actuation element and an actuation medium for activation of supplementary functions of the tool, the actuation medium in communication with the space; and
 separation means disposed in the space for separating the actuation unit from the control fluid supply, wherein a first side of the separation means is exposed to the control fluid supply and a second side of the separation means is exposed to the actuation medium, the separation means being peripherally immobilized between portions of the housing; and
 wherein the control fluid supply selectively imparts force on the separation mean to in turn impart force on the actuation medium.

20. The tool according to claim 19, wherein the separation means is a flexible member.

* * * * *